United States Patent [19]
Flix

[11] Patent Number: 6,112,880
[45] Date of Patent: Sep. 5, 2000

[54] DEVICE FOR FORMING LOTS OF PRODUCTS AND SEPARATING SAID LOTS FROM EACH OTHER AND, CONVERSELY, PACKING THEM

[75] Inventor: Jean-Marie Flix, Saint-Germain, France

[73] Assignee: Societe A.P.I., France

[21] Appl. No.: 08/935,036

[22] Filed: Sep. 22, 1997

[30] Foreign Application Priority Data

Feb. 14, 1997 [FR] France .................................. 97 01921

[51] Int. Cl.[7] ................................................ B65G 47/26
[52] U.S. Cl. ...................................... 198/419.2; 198/426
[58] Field of Search ........................... 198/418.7, 419.2, 198/426, 430, 432, 459.2, 480.1

[56] References Cited

U.S. PATENT DOCUMENTS

| | | | |
|---|---|---|---|
| 4,164,997 | 8/1979 | Mueller | 198/427 |
| 4,469,217 | 9/1984 | Meyer et al. | 198/419.2 |
| 4,697,691 | 10/1987 | Zodrow et al. | 198/426 |
| 5,191,964 | 3/1993 | Spisak et al. | 198/447 |

*Primary Examiner*—James R. Bidwell
*Attorney, Agent, or Firm*—Ostrolenk, Faber, Gerb & Soffen, LLP

[57] ABSTRACT

A lot forming device for forming separated lots of products which are coming off a first conveyor: The device comprising rotatable first and second circle sectors each on a respective drivable shaft and each having receptacles on its periphery for receiving products. A disk with peripheral receptacles is placed to receive the products from each of the sectors in turn. The disk is rotatable at a respective second shaft and delivers the separated lot of products to a following conveyor. The speeds of rotation of the sectors are controllable to separate the products into lots and to deliver them to the outlet conveyor at the selected speed. There may be a plurality of devices for arranging lots of the products in rows.

22 Claims, 2 Drawing Sheets

DEVICE FOR FORMING LOTS OF PRODUCTS AND SEPARATING SAID LOTS FROM EACH OTHER AND, CONVERSELY, PACKING THEM

BACKGROUND OF THE INVENTION

The present invention relates to a device for forming several lots of products and separating the lots from each other and, conversely, packing them.

Systems for separating products by means of variable pitch screws are known. But they can only form the products into a row of units or several rows of units placed side by side with a relatively large distance between the products and the rows thereof, and cannot form lots of grouped products.

The known device described in French Patent A 2,710,317 comprises a transfer belt which is stretched between two drive wheels with vertical axes. The belt has uniformly spaced fastening means each intended for the attachment of a carriage comprising a separating and holding element of cap type which is movable in vertical translation. The belt may be provided with other means having the function of covering a given number of products in order to form a lot of those products. A variable pitch screw makes it possible to progressively create an increasing space between the carriages and therefore between the successive lots.

However, this type of device takes up a large amount of space due to its use of a variable pitch screw.

SUMMARY OF THE INVENTION

The object of the present invention is to remedy the above described drawbacks with a device which makes it possible to form lots of the products and to separate the lots, while taking up less space than existing devices.

The device of the invention is positioned at the outlet of a feed conveyor which feeds products in a single row. The device comprises at least two concentric shafts. Each shaft is rotated by drive means independently of the other shafts. The drive means is actuated by a control system. Each shaft is equipped with a sector of a circle which is oriented perpendicular to and is attached to the shaft. Each sector is provided at its peripheral edge with cutouts that are adapted to engage the products being fed by the conveyor so as to form a lot of the products. The parameters of speed and acceleration of each of the sectors, which move in an operating sequence one after the other, are determined by the control system in accordance with the different phases of formation and separation of the product lots.

During the phase of forming a lot, a first sector operates at a nominal speed to grasp a lot of the products, while imposing its speed on the displacement of the products coming off the feed conveyor.

During the phase of the separation of the lot formed by the first sector, that sector is accelerated to space it from the next trailing second sector which is in the stage of forming another lot. The acceleration brings the first sector to a given speed, which enables it to transfer the lot to another outlet conveyor after travel around a path of about 180°.

The 360° cycle concludes by again imparting to the first sector the nominal speed for grasping products from the outlet of the conveyor, and so on.

The lots of products thus formed are transferred to the other outlet conveyor and are there taken over by handling means, such as dogs fastened on a chain or a belt advancing along the outlet conveyor.

As a further feature, the device of the invention further comprises a disk having an axis parallel to and laterally spaced away from the shafts. The disk supports its own sectors which are arranged tangentially to the cutouts of the sectors on the shafts and the disk has cutouts that are similar to the cutouts of the two sectors. This permits the transfer of the lots of products to the outlet conveyor with a selected direction of advance, e.g., the direction identical to that of the product feed conveyor.

As an additional feature, the device of the invention comprises a curved conveyor arranged at the outlet of the feed conveyor of the products and upstream of the sectors. This permits the transfer of the lots of products to the outlet conveyor along a direction of advance that is identical to that of the product feed conveyor.

Other objects and features of the present invention are evident from the following description which refers to the accompanying drawing which is given merely by way of illustration of the invention.

DESCRIPTION OF PREFERRED EMBODIMENTS OF THE INVENTION

Figure 1:
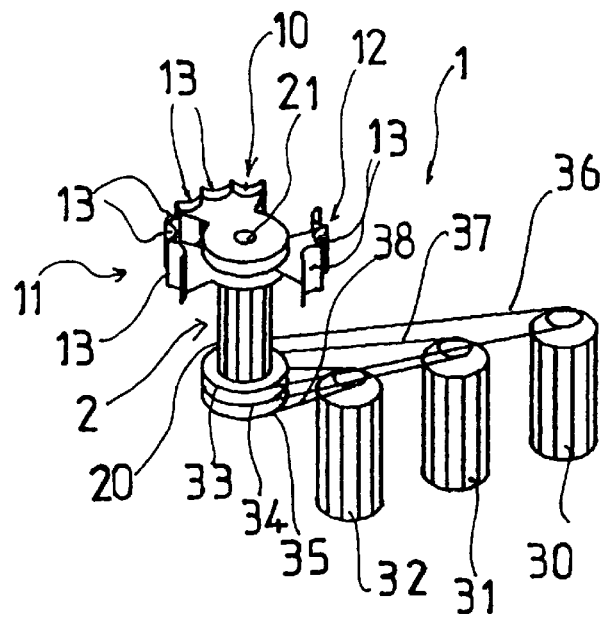
FIG. 1 is a diagrammatic perspective view of a device of the invention.

FIG. 1 shows that the device 1 of the invention comprises three identical circle sectors 10, 11, 12, each fastened to and oriented perpendicular to the upper end of a respective shaft 2, of which only the outer one of the shafts 20 is visible. The three sector supporting shafts 2 are arranged concentrically with the same axis of rotation 21 and the shafts are of increasing length and height from the shaft of largest diameter at the outside to the shaft of smallest diameter on the inside. This positions the sectors 10, 11, 12 one above the other and axially spaced apart by distances such that the sectors can be rotated around the axis 21 via their shafts 2, substantially in the same circular area.

Each shaft 2 is rotated around the axis 21 by a respective electric motor 30, 31, 32 which is controlled independently of the other motors by an electronic control unit, not shown, via a respective pulley 33, 34, 35 fastened to the lower ends of the shafts 2 operated upon by a respective transmission belt 36, 37, 38.

Each sector 10, 11, 12 has cutouts of generally semicircular shape 13 in its peripheral free edge. Each cutout is capable of gripping a product, such as a bottle. The shapes of the cutouts may be different as a function of the products to be grasped.

The control unit is programmed to electrically operate the motors 30, 31, 32 to impart a given speed and/or acceleration to the sectors 10, 11, 12, via their shafts 2 as a function of the different phases of formation, separation, and transfer of the lots of products.

FIG. 2 shows a device 1 which has been placed at the outlet of a conveyor 4 which feeds bottles 40 aligned in a single row. The sectors 10, 11, 12 revolve in a plane parallel to the plane of the conveyor.

The device 1 further comprises a disk 5 with an axis of rotation 50 that is parallel to the axis 21 of the shafts 2. The disk 5 has three series 51, 52, 53 of three cutouts 54 each in its peripheral edge similar to the cutouts 13 of the sectors 10, 11, 12. The cutouts 54 are intended also to engage and receive the products 40 from the sectors 10, 11, 12, that were fed by the conveyor 4 so that the products emerge from the device 1 onto an outlet conveyor 6. On the outlet conveyor, the products are held between dogs 60 driven by a chain or belt (not shown), with a direction of displacement that is, for example, identical to that of the feed conveyor 4.

One could arrange the disk 5 upstream of the sectors 10, 11, 12, just at the outlet of the conveyor 4 with the conveyor tangential to the disk. The disk 5 would then have semicircular cutouts all around its periphery and would turn in a clockwise direction, while the sectors 10, 11, 12 would turn counterclockwise around the axis 21 of the shafts 2. Alternately, the disk 5 may be replaced by a curved conveyor arranged at the outlet of the conveyor 4, upstream of the sectors 10, 11, 12.

The device 1 also comprises two circular guides 7 and 7' for holding the products in the cutouts 13 of the sectors 10, 11, 12 and in the cutouts 54 of the disk 5, respectively, upon rotation of the sectors 10, 11, 12 and the disk 5.

The motors 30, 31, 32 are advantageously driven by electric pulses. Counting the pulses with a digital calculator integrated in the control system makes it possible to precisely determine the angular position of the sectors at each moment and to properly synchronize the assembly of moving elements constituting the device.

Figure 2A:
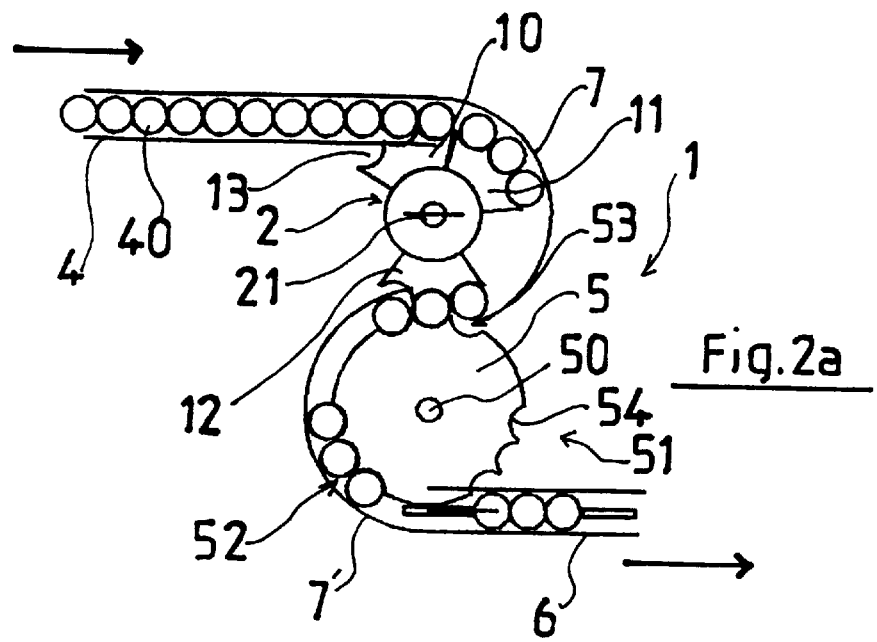
FIGS. 2a, 2b and 2c are diagrammatic plan views of the different operating phases of the device.

The operation of the device 1 is described:

In FIG. 2a, the sector 10 which is at the entrance of the conveyor 4 moves at a nominal speed that is substantially equal to the speed of the conveyor 4, and grasps the first three bottles 40, while the sector 11, which had previously grasped three bottles 40, starts its phase of acceleration. This creates a space between the three bottles at the sector 11 and the following lot of three bottles that is formed by the sector 10. The sector 12, which is about 180° from the sector 10 in the phase of grasping the bottles, has a speed substantially equal to that of the disk 5 and is synchronized with the disk so that the sector 12 can transfer its lot of bottles 40 to the disk 5 in the cutouts 54 of a series 50 which comes opposite the sector 12.

Figure 2B:
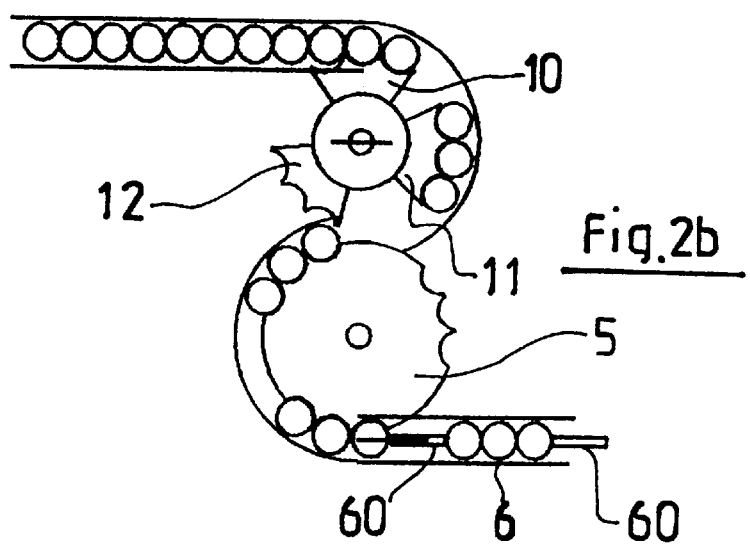

Then, as seen in FIG. 2b, the sector 12, which has just transferred its lot of bottles to the disk 5, enters a phase of deceleration until it reaches the nominal speed of grasping a new lot of products upon the arrival of the feed conveyor 4. Meanwhile, the sector 11, which follows the sector 12, is in its phase of acceleration to the speed of transfer of its lot of bottles 40 to the disk 5, while the sector 10 is terminating its phase of grasping the bottles 40.

Figure 2C:
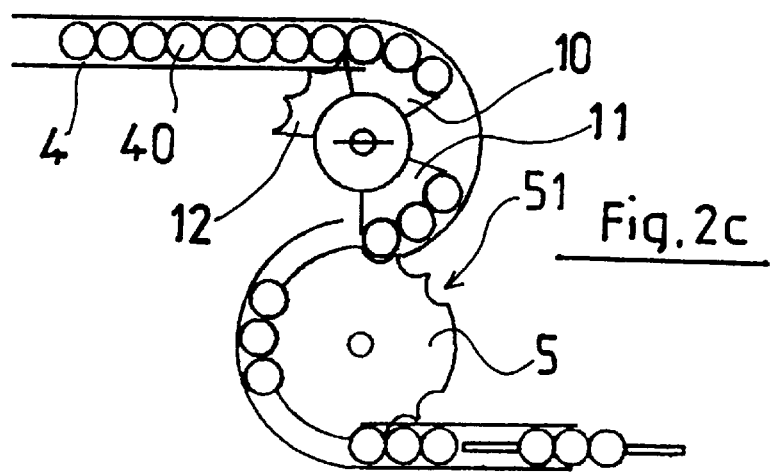

Finally, in FIG. 2c, the sector 10 leaves its bottle grasping phase and is accelerated, while the sector 12 starts its phase of grasping the first three bottles 40, and while the sector 11 is approaching the disk 5 at a speed substantially identical to the disk and synchronized with the series 51 of cutouts 54 of the disk 5, which comes opposite the said sector 11.

The lots of bottles 40 thus formed are removed on the outlet conveyor 6 along a direction of displacement that is preferably identical to that of the flow of bottles arriving toward the device 1 on the feed conveyor 4.

Figure 3:
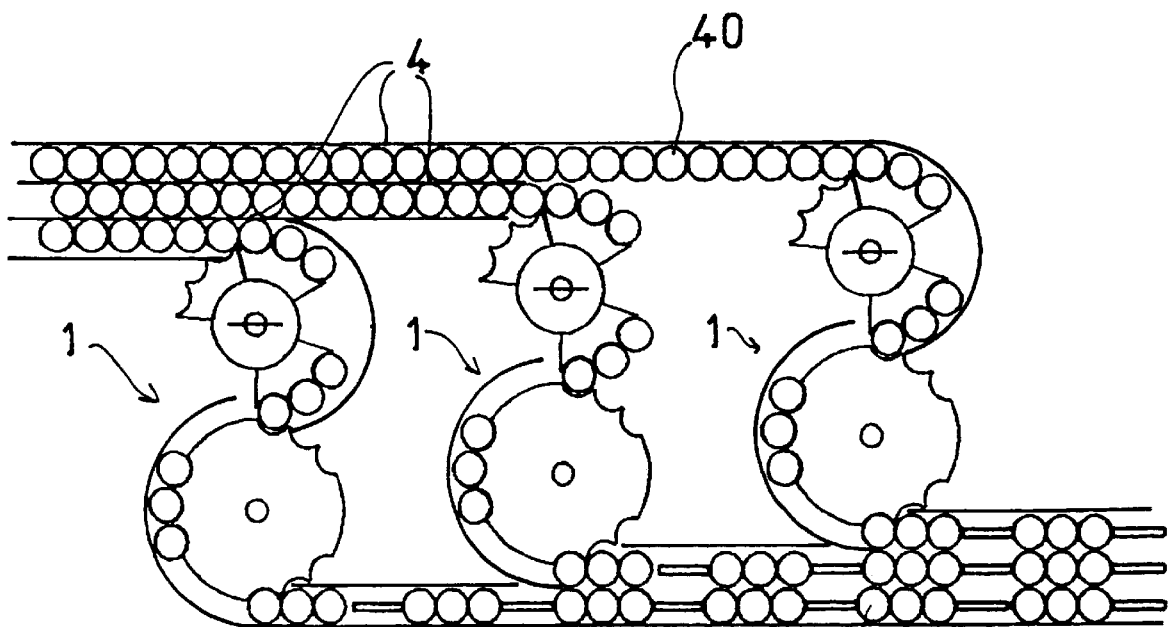
FIG. 3 is a plan view of the device in accordance with the invention associated with two other identical devices in order to form lots of products in three rows.

FIG. 3 shows a device 1 that is associated with two other devices 1 arranged one behind the other and at a constant lateral offset one after the other. This arrangement makes it possible to form lots of bottles 40 comprising several rows side by side.

This entire device may comprise a common motor drive for actuating the shafts 2 of each device, so as to obtain an identical number of products 40 on all the paths, in particular by lots, or may comprise separate drives for obtaining lots of products 40 arranged staggered, that is, by creating a longitudinal offset of the rows of products 40 thus formed.

The cutouts in the sectors 10, 11, 12 can be provided in parts which can be removably fastened to the peripheral edges of the sector. This makes it advantageously possible to modify the number of bottles in a lot of products 40.

Furthermore, one can contemplate any other drive means for the shafts 2 within the invention, such as a cam device.

It will be easily understood that the device 1 can also form a row of products aligned one against the other or at a slight distance apart from a row of lots of products, the speed and acceleration parameters of the sectors 10, 11, 12 as well as the phases of bringing the lots together then being modified accordingly.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A lot forming device for forming separated lots of products, each lot comprised of at least one of the products, wherein the products are from a continuous row of the products delivered to the lot forming device from the outlet of a first conveyor and wherein the device is for delivering the lots of products to a following device; the lot forming device comprising:

at least a first and a second sector, each sector supported for rotation independently of the other sectors; respective first and second coaxial shafts on which the first and second sectors are supported for rotation; each of the first and second sectors having a respective set of receptacles therein for receiving therein a respective lot of the products from the outlet of the first conveyor;

drive means connected with the first and second shafts for driving the respective sectors to rotate according to respective speed and acceleration parameters of the sectors for forming lots of the products and for delivering the lots to the following device;

control means for the drive means and operable in accordance with different phases of formation and separation of lots of the products, such that during a phase of forming a first lot of the products, the first one of the sectors is rotated at a speed that permits the receptacles of the first sector to receive a first lot of the products and the first sector being operable at a respective first speed upon displacement of the products from the first conveyor;

during a following phase of separation from the first conveyor of the first lot formed at the first sector, the first sector is accelerated in speed by the drive means operated by the control means so that the first lot at the first sector is spaced from a second lot at the second sector which follows the first sector in rotation around the axis, and for bringing the first sector to a predetermined speed which promotes the transfer of the first lot in the first sector to the following device;

during a phase of forming a second lot of the products, upon the second sector then passing the outlet from the first conveyor the second sector receiving in the respective receptacles thereof a second lot of the products; the drive means thereafter imparting to the second sector an acceleration and speed separating the second lot of the products from the conveyor and from the first sector around the axis and for subsequently delivering the second lot of the products to the following device; and at a third phase of forming another lot of the products, the drive means then decelerating the first sector to the speed of the products leaving the outlet of the first conveyor to form another lot of the products at the first sector;

the control means causing the drive means to thereafter repeat the phases.

2. The device of claim 1, wherein the receptacles on the first and second sectors comprise the sectors having peripheral edges and the receptacles comprising cutouts in the peripheral edges shaped for receiving respective products therein.

3. In combination, a plurality of the devices of claim 1, wherein each of the first axes is laterally offset with reference to the others of the first axes, and the respective first and second sectors of each of the devices is positioned at a respective outlet from a respective first conveyor therefor, the first and second sectors of each of the devices being so positioned and the following devices being so positioned as to create lots of the products grouped on several rows arranged side by side, wherein each of the rows has respective lots of the products therein.

4. The device of claim 1, wherein the following device is so placed and the drive means operates on the first and second shafts such that the first sector is moved to a speed for delivering the first lot of products to the following device after the first sector rotates around a path of about 180° from the first conveyor, and the following device is so positioned as to receive the first lot of products after the first sector has rotated about 180°; and the second sector delivers a lot of products to the following device after the second sector has been rotated about 180° from the first conveyor.

5. The device of claim 3, wherein the drive means for each of the shafts comprises an electric motor.

6. The device of claim 3, wherein the drive means for each of the shafts comprises a cam device.

7. The device of claim 2, wherein the sectors include removably fastenable portions on the periphery thereof in which the cutouts are formed for receiving the products.

8. The device of claim 1, wherein the following device comprises a disk supported for rotation about a second axis that is spaced from the first axis, the second disk being rotatable by the drive means and controlled by the control means;

second receptacles defined on the disk shaped and positioned for receiving a lot of the products from the first and second sectors, the disk having a speed of rotation controlled by the control means so that the rotation of the second disk is synchronized with the respective one of the first and second sectors then rotating past the second disk during the phase of transfer of the products from each of the first and second sectors respectively to the disk in order to permit the transfer of the products to the disk;

the following device further comprising a second outlet conveyor following the disk for receiving the transfer of the lots of products to the outlet conveyor from the second disk.

9. The device of claim 8, wherein the outlet conveyor has a direction of advance oriented to be generally identical to that of the direction of advance of the products at the outlet from the first conveyor.

10. The device of claim 8, wherein the second receptacles of the disk comprise the disk having a peripheral edge and respective cutouts formed in the peripheral edge of the disk to cooperate with the first receptacles on the first and second sectors for receiving the lot of products from the sectors.

11. The device of claim 8, wherein the first and second axes are so positioned and the first and second sets of receptacles on the sectors and on the second disk are so positioned that the first and second receptacles pass essentially tangent to each other at a location to enable the transfer of the products from the first and second sectors to the disk at the tangent location.

12. The device of claim 11, wherein the disk is downstream in the path of the lots of products from the first conveyor to the second outlet conveyor and the sectors rotate in one direction while the second disk rotates in the opposite direction.

13. The device of claim 1, further comprising a curved conveyor placed at the outlet of the first conveyor and upstream in the path of the lot of products from the first conveyor to the first and second sectors, for enabling transfer of the lots of products onto the following device with a selective direction of advance of the lot of products onto the following device.

14. The device of claim 11, further comprising a respective curved guide extending around and spaced outward from the first axis for guiding the lots of products in the first receptacles of the first and second sectors; and a second curved guide around the disk for guiding the path of the lots of the products on the disk.

15. The device of claim 10, wherein further comprising a respective curved guide extending around and spaced outward from the first axis for guiding the lots of products in the first receptacles of the first and second sectors and a second curved guide around the second disk for guiding the path of the lots of the products on the second disk.

16. The device of claim 8, wherein the following device comprises an outlet conveyor including holding means thereon advancing away from the second disk.

17. The device of claim 3, wherein the following device comprises a disk supported for rotation about a second axis that is spaced from the first axis, the second disk being rotatable by the drive means and controlled by the control means;

second receptacles defined on the disk shaped and positioned for receiving a lot of the products from the first and second sectors, the disk having a speed of rotation controlled by the control means so that the rotation of the second disk is synchronized with the respective one of the first and second sectors then rotating past the second disk during the phase of transfer of the products from each of the first and second sectors respectively to the disk in order to permit the transfer of the products to the disk;

the following device further comprising a second outlet conveyor following the disk for receiving the transfer of the lots of products to the outlet conveyor from the second disk.

18. The device of claim 17, wherein each of the second axes of each of the devices is laterally offset from the second axis of the other devices, and the second conveyors receiving lots of products from the second disks are respectively so placed as to form the lots of products from each of the devices in several rows corresponding to the second disks and arranged side by side.

19. The combination of claim 17, wherein each of the first sectors has a respective first shaft at its first axis and the second disk has a second shaft at its second axis;

each of the respective ones of the first shafts of each of the devices in the combination has a common drive and each of the second shafts in each of the combinations has a common drive.

20. The device of claim 3, wherein each of the first sectors has a respective first shaft at its first axis and the second disk has a second shaft at its second axis;

the respective first shaft of each of the devices is driven by a respective separate drive unconnected with the drives of the other devices of the combination.

21. The device of claim 16, wherein the outlet conveyor comprises a chain or belt advancing away from the second disk and the holding means are on the chain or belt.

22. The device of claim 21, wherein the holding means are dogs.

* * * * *